R. Winans,

Feeding Boiler Furnaces,

No. 307, Patented July 29, 1837.

N. PETERS, PHOTO-LITHOGRAPHER, WASHINGTON, D. C.

UNITED STATES PATENT OFFICE.

ROSS WINANS, OF BALTIMORE, MARYLAND.

APPARATUS FOR BLOWING FIRES IN LOCOMOTIVE STEAM-ENGINES.

Specification of Letters Patent No. 307, dated July 29, 1837.

*To all whom it may concern:*

Be it known that I, ROSS WINANS, of the city of Baltimore and State of Maryland, have invented certain new and useful improvements in an apparatus which turns to advantage the waste steam from the exhaust or eduction pipe of a steam-engine, by which a blast is obtained to urge the fire while it at the same time heats the water which is supplied by the force pumps to the boiler.

In describing the apparatus, I shall include certain parts previously in use, with others which I have devised, and which constitute my claim to invention.

Figure 5:
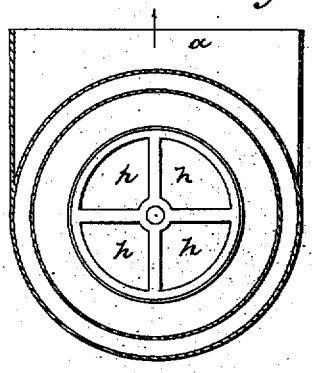
Figure 1:
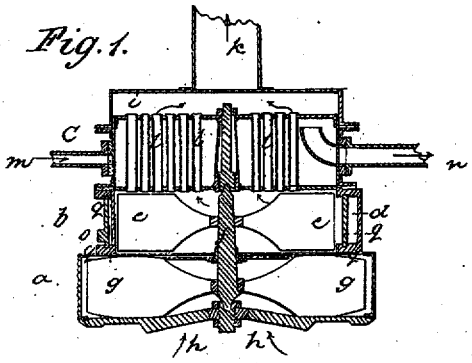

The whole apparatus is composed of four compartments, or chambers, marked *a*, *b*, *c*, and *i*, in drawing Figure 1. The steam issuing from the eduction pipe of high-pressure engine is to be conveyed in to the compartment *b*, through the aperture *d*, Figs. 1, 2, 3, and 6, where, in following the direction of the arrows, it strikes the wings, or vanes, *e*, *e*, *e*, *e*, of the fan, represented in Fig. 2, to which it imparts a rapid rotary motion. In compartment *b*, Fig. 1, the same steam wheel, or fan, *e*, *e*, is represented, and on to the lower part of its shaft, *f*, is also fixed a similar, but larger, fan, *g*, *g*, which moves in the lowermost compartment, *a*, Fig. 1. This compartment has at its bottom a communication with the open air through the openings *h*, *h*, *h*, *h*, Figs. 1 and 5; it has also a free communication with a tight ash-pan (under the fire grates of the boiler) through an opening in one of its sides, 24 inches in one direction by six the other; this opening is connected with a similar opening in the side of the ash-pan, by means of the pipe, or trunk, *a*, Figs. 5 and 6.

Figure 2:
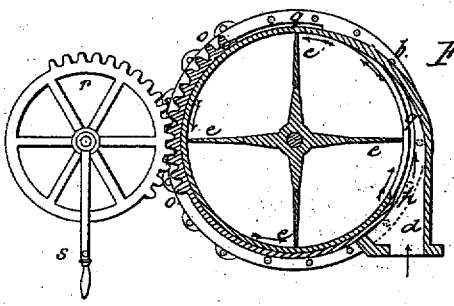

When the steam, or fan, wheel *e*, in the compartment *b*, Figs. 1, and 2, is put in motion by the impetus of the exhaust steam, as before described, the fan-wheel *g*, in the compartment *a*, Fig. 1, being on the same axle, receives a similar rotary motion by the action of which a current of air is forced into the ash pan, and up through the burning fuel under the boiler, giving great energy to the fire.

Compartment *c*, Fig. 1, is a drum, in the two heads of which there are numerous holes through which small metal tubes (say half an inch in diameter) are inserted reaching from one end to the other, as represented in the drawing. These tubes are made tight in the holes, by riveting. By means of these tubes a free communication, or passage, for the steam is formed between the compartments *b*, and *i*, Fig. 1.

Figure 6:
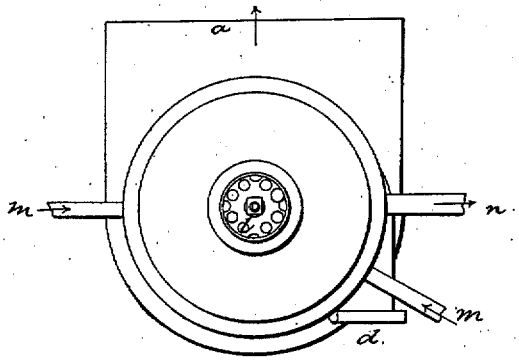

The pipe *m*, Figs. 1 and 6, is connected with the force pump, and the pipe *n*, Figs. 1, and 6, is connected with the boiler, so that the drum, or compartment, *c*, constitutes an enlargement of the water supply-pipe between the pump and the boiler; and when the pump is in action it is, necessarily, kept full of water.

When the engine is in motion, the exhaust steam, after having performed its office of creating a blast in the compartment *c*, passes up through the tubes, before described, into the compartment *i*, and thence through the pipe *k*, into the open air. The steam on its passage through the pipes, communicates a portion of its heat to the water surrounding them, which water is to supply the boiler.

Figure 4:
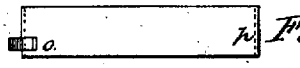
Figure 3:
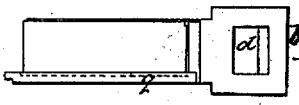

It is of great importance in the steam-engine to be able to diminish, to increase, and to regulate the blast with facility, as the intensity of the fire and the quantity of steam generated may be thereby controlled. To effect this, a circular slide, *o*, Fig. 2, is used; this slide is represented separately in Fig. 4, and may be distinguished by the etched lines in Fig. 2, where one of its ends terminates at *o*, and the other at *p*, with the steam-channel, *d*, leading from the cylinder to the steam, or fan, wheel. This slide moves in a groove *q*, *q*, Fig. 1, shown also in a front elevation of the box, or compartment, *c*, Fig. 1. This slide may be worked by turning the handle *s*, of the toothed wheel *r*, which meshes into corresponding teeth on the slide, Fig. 2. It will be perceived that, by pushing the extremity, *p*, of the slide toward the point *q*, the aperture, or channel, *d*, through which the exhaust steam from the steam-engine cylinder passes into the box *c*, which contains the steam-wheel, or fan, must become narrower; but the quantity of steam expelled from the cylinder at each stroke of the piston, remaining the same, this steam must pass with a greater velocity through the diminished aperture than it did through the larger one; and, consequently, it must increase the rapidity of the revolution of the steam fan *e*, *e*; and the air-fan *g*, *g*, being carried around with the same speed the blast will also be increased. The whole movement of the slide, and the openings through which the steam passes on to the steam-wheel, are so arranged the steam may be caused to jet on to the wheel through an opening of a single square inch, and may be expanded at pleasure to an opening equal to 16 square inches, or to any intermediate dimensions. By means of this expansion and contraction of the aperture through which the steam jets on to the steam-wheel, a more intense blast and a greater range and control over it is furnished with less reaction, and with less detriment to the working of the engine, than heretofore.

The principle of creating a blast for steam boilers by propelling a fan by means of the exhaust steam, was patented by the late Phineas Davis, on the 29th July, 1834; the following is a general description of the apparatus for carrying his invention into operation.

On a shaft about 3½ feet long are placed three fan-wheels; one near each end, for the purpose of throwing air, and one near the middle, to be propelled by the exhaust steam; this shaft is horizontal, and when used on locomotive engines is situated crosswise of the engine; the drums inclosing the air-wheels are several inches distant from the drum inclosing the steam-wheel, and are secured in their relative positions by iron braces attached to each of them. The blast is varied and regulated by means of a valve situated in the steam channel leading from the cylinder to the fan, or steam wheel, and at some little distance from the immediate jet of the steam into the drum containing the steam wheel, which jet passes through an aperture of from 3 to 4 square inches, or about one half the area of the steam opening in the valve face of the cylinder; the remaining part of the channel, including that where the valve for the blast is situated, has an opening equal to about 10 square inches. The valve is so arranged that all the steam may be forced through the contracted passage, just described, into the steam drum to act on the fan-wheel; or all, or any part, of it may be suffered to escape by another passage into the open air, without acting on the wheel; by this means the blast is carried. The escape, or opening, for the passage of the steam past the valve, always remains the same; when the opening in the direction of the fan is closed, the opening in the direction of the open air is increased in the same degree, the use of the valve being only to turn the steam into one passage, or the other, at pleasure.

The contraction in the passage at the jet of the steam onto the fan-wheel, in this apparatus, is permanent, and not variable at pleasure; in consequence of this, it is often advisable to forego the advantages of as strong a blast as would otherwise be preferred, rather than obtain it by a still further contraction of the jet passage, which would react on the cylinders, and be permanently detrimental to the working of the engine. Again, whenever a less blast is required than that produced by the entire quantity of exhaust steam acting on the wheel, a part of the steam being wasted, or its action on the wheel lost, the remaining part that acts on the wheel must necessarily be forced through a smaller passage, to produce the desired effect, (than would be the case was all the steam to act on the wheel) and, consequently, be more detrimental to the working of the engine. The heating the water in its passage to the boiler by forcing it through a vessel containing numerous small tubes through which the steam passes, in the manner herein described, is also the subject of an application for a patent now pending in the Patent Office of the United States.

The improvements contained in the apparatus first above described, which are believed to be new, and for which a Patent is asked, are—

1. The varying, increasing, and regulating the blast created by the fan wheel, by contracting, or enlarging, the passage, or aperture, through which the steam issues on to the fan-wheel, substantially in the manner, and for the purpose, described. This expansion and contraction of the passage may be effected in various ways besides the one set forth. But while the same effect is obtained by analogous means, it will be manifest that the principle of my invention is adapted.

2. I claim the placing of the steam and fan wheels upon an upright shaft, and the arrangement of the different parts in conformity therewith, as herein described, which enables me to combine the steam and fan wheels in a convenient and compact form, for the use of locomotive engines.

ROSS WINANS.

Witnesses:
THOS. P. JONES,
DENNET T. FOOTE.